(12) United States Patent  (10) Patent No.: US 6,525,909 B1
Qian et al.  (45) Date of Patent: Feb. 25, 2003

(54) DISC HEAD SLIDER HAVING DEEPLY RECESSED CORNERS

(75) Inventors: Weimin Qian, Bloomington, MN (US); Lowell J. Berg, Eden Prairie, MN (US); Lanshi Zheng, Eden Prairie, MN (US); Moshe Olim, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 95 days.

(21) Appl. No.: 09/717,677

(22) Filed: Nov. 21, 2000

Related U.S. Application Data (60) Provisional application No. 60/200,515, filed on Apr. 27, 2000.

(51) Int. Cl.$^7$ .................................................. G11B 5/60
(52) U.S. Cl. ................................................... 360/235.7
(58) Field of Search ........................... 360/235.7, 236.5

(56) References Cited

U.S. PATENT DOCUMENTS

| | | | |
|---|---|---|---|
| 4,673,996 A | 6/1987 | White ........................ 360/103 |
| 4,961,121 A | 10/1990 | Astheimer et al. .......... 360/103 |
| 4,996,614 A | 2/1991 | Okutsu ....................... 360/103 |
| 5,267,109 A | 11/1993 | Chapin et al. .............. 360/103 |
| 5,473,485 A | 12/1995 | Leung et al. ............... 360/103 |
| 6,021,020 A | * 2/2000 | Itoh ........................ 360/235.7 |
| 6,301,079 B1 | * 10/2001 | Hanamoto ............... 360/235.7 |

FOREIGN PATENT DOCUMENTS

JP  62-279515  4/1987

* cited by examiner

Primary Examiner—A. J. Heinz
(74) Attorney, Agent, or Firm—Westman, Champlin & Kelly (57) ABSTRACT

A disc head slider supports a transducer relative to a data storage disc. The slider includes a slider body having a disc-facing surface with a leading slider edge, a trailing slider edge, and first and second slider corners at opposing ends of the trailing slider edge. First and second rails are disposed on the disc facing surface about a central recess and form first and second bearing surfaces, respectively. The central recess has a depth measured from the first and second bearing surfaces. First and second recessed surfaces are positioned between a trailing edge of the first and second rails and the first and second slider corners, respectively, and are generally coplanar with the central recess. Third and fourth recessed corner surfaces are positioned at the first and second slider corners, respectively, and are recessed from the first and second recessed surfaces.

20 Claims, 6 Drawing Sheets

DISC HEAD SLIDER HAVING DEEPLY RECESSED CORNERS

CROSS-REFERENCE TO RELATED APPLICATION

This application claims the benefit of U.S. Provisional Application Serial No. 60/200,515, entitled "AIR BEARING SLIDERS HAVING RECESSED EDGES," filed Apr. 27, 2000.

BACKGROUND OF THE INVENTION

The present invention relates to disc drive data storage systems and, more particularly, to a disc drive data storage system having a slider with deeply recessed corners.

Disc drives are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each disc head slider. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes a hydrodynamic (e.g. air) bearing surface, which faces the disc surface. As the disc rotates, the disc drags air under the slider and along the bearing surface in a direction approxinmately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider fly above or in close proximiy to the disc surface.

In ramp load-unload applications, the disc drive further includes a ramp positioned at an outer diameter of the disc for engaging the suspension. When the disc drive is powered down, the actuator mechanism moves the suspension radially outward until the suspension engages the ramp, causing the slider to lift off of the disc surface. In the case of a slider having a subambient pressure cavity, the suspension and slider must overcome the suction force developed by the subambient pressure cavity (which tends to pull the slider toward the disc) in order to lift the slider up the ramp. During power-up, the disc is accelerated to its normal operating velocity and then the actuator mechanism moves the suspension radially inward such that the suspension disengages the ramp allowing the slider to become loaded on to the disc surface.

Using a ramp to load and unload the suspension relative to the disc surface has been regarded as an attractive alternative to "contact start/stop" technology in which the slider lands and takes-off from a dedicated zone on the disc surface. The ramp load-unload technique can be used for solving tribological problems associated with lower fly heights and for meeting severe requirements of non-operational shock performance. However, this technique introduces an array of other challenges, such as possible severe head-media impact during loading and unloading operations.

Under nominal conditions, advanced air bearings (AABs) can be designed to avoid head-media contact during load and unload. Manufacturing of actual parts, however, introduces deviation from nominal conditions, which can result in larger susceptibility of impact during load-unload operations. Among the numerous dimensions and geometrical features to be controlled during manufacturing, pitch static attitude (PSA) and roll static attitude (RSA) are the most critical parameters for load-unload applications. PSA is the angle formed between the slider and the suspension in a direction parallel to the suspension's axis of symmetry when no air bearing is formed (i.e., in a "static" state). RSA is the angle formed between the slider and the suspension in a direction perpendicular to the suspension's axis of symmetry.

Since PSA and RSA have an influence on the pitch and roll attitude of the slider during flight, manufacturing tolerances that result in a non-optimal PSA or RSA cause the slider to tilt with respect to the radial motion of the suspension during loading and unloading operations. Under these conditions, it is possible that the corners of the slider can become close enough to the media to induce light contact or severe impact. When the slider is being loaded onto the disc, a corner or edge of the slider can contact the disc before an air bearing has been developed. During unloading, imbalances between the suction force and the lift force can also cause the slider to contact the disc. This contact can cause damage to stored data, thermal asperities and permanent physical damage to the slider and disc surfaces.

Similarly, in a contact-start-stop system, a corner of the slider can contact the disc in response to shock forces applied to the disc drive or other events that cause a variation in the flying height of the slider. Any such contact leads to wear of the slider and the recording surface and is potentially catastrophic.

One method of reducing damage caused by contact between the slider and the disc is to provide landing pads on the slider, which have a smoother contact surface than the etched surfaces on the slider body. The landing pads can be below or within the pressurization plane of the bearing surface. Another method of reducing damage caused by contact between the slider and the disc is to provide the bearing surface with at least one rounded corner. Also, the non-bearing surfaces can be provided with at least one rounded edge. As a result, the disc surface is less likely to be damaged when hit by the rounded corner or edge than a sharp corner or edge.

However, strong contact can still occur with the above-mentioned methods. A slider is therefore desired that avoids or reduces contact with the disc surface during operational shock events or during load and unload operations.

SUMMARY OF THE INVENTION

One aspect of the present invention relates to a disc head slider for supporting a transducer relative to a data storage disc. The slider includes a slider body having a disc-facing surface with a leading slider edge, a trailing slider edge, and first and second slider corners at opposing ends of the trailing slider edge. First and second rails are disposed on the disc facing surface about a central recess and form first and second bearing surfaces, respectively. The central recess has a depth measured from the first and second bearing surfaces.

First and second recessed surfaces are positioned between a trailing edge of the first and second rails and the first and second slider corners, respectively, and are generally coplanar with the central recess. Third and fourth recessed corner surfaces are positioned at the first and second slider corners, respectively, and are recessed from the first and second recessed surfaces.

Another aspect of the present invention relates to a disc drive assembly, which includes a housing, a disc, an actuator, a ramp and a slider. The disc is rotatable about a central axis within the housing. The actuator is mounted within the housing and has a parked position along an edge of the disc. The ramp is positioned along the edge of the disc to engage a portion of the actuator when the actuator is in the parked position. The slider is supported over the disc by the actuator and includes a disc-facing surface with a leading slider edge, a trailing slider edge, and first and second slider corners at opposing ends of the trailing slider edge. First and second rails are disposed on the disc facing surface about a central recess and form first and second bearing surfaces, respectively. The central recess has a depth measured from the first and second bearing surfaces. First and second recessed surfaces are positioned between a trailing edge of the first and second rails and the first and second slider corners, respectively, and are generally coplanar with the central recess. Third and fourth recessed corner surfaces are positioned at the first and second slider corners, respectively, and are recessed from the first and second recessed surfaces.

Another aspect of the present invention relates to a disc drive assembly having a disc rotatable about a central axis, a ramp load-unload suspension and a slider bearing supported over the disc by the suspension. The slider bearing has deeply recessed trailing corners for forming recessed bearing surfaces that limit contact energy between the slider bearing means and the disc during ramp load and unload operations of the suspension.

BRIEF DESCRIPTION OF THE DRAWINGS

FIG. 3-1 is a side view of the slider shown in FIG. 2 over a disc surface at a pitch and roll angle at which contact with the disc surface is possible.

FIG. 3-2 is an end view of the slider shown in FIG. 2 over the disc surface at the pitch and roll angles shown in FIG. 3-1.

DETAILED DESCRIPTION OF ILLUSTRATIVE EMBODIMENTS

Figure 1:
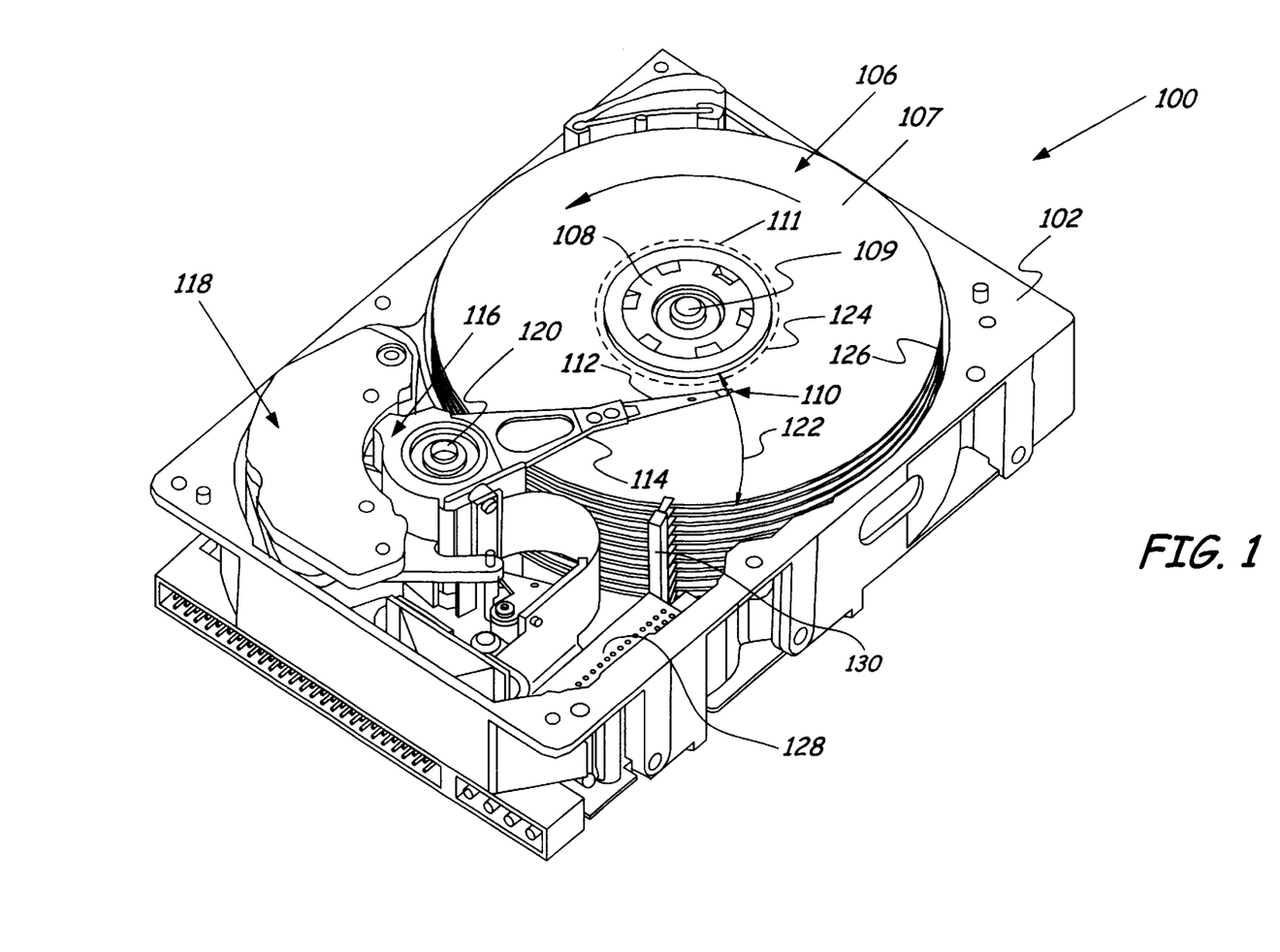
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

As discussed in more detail below, slider 110 has a hydrodynamic (e.g., air) bearing that reduces the chance of head-media contact in ramp load-unload applications and in contact start-stop applications. In ramp load-unload applications, disc drive 100 includes a ramp 130 for each suspension 112. Ramps 130 are positioned near disc outer diameter 126. When disc drive 100 is powered-down, voice coil motor 118 rotates actuator 116 toward disc outer diameter 126 so that suspensions 112 engage the respective ramps 130. Ramps 130 lift suspensions 112 so that sliders 110 are unloaded from the disc surface. During power-up, once discs 107 have accelerated to their operating rotation velocity, voice coil motor 118 rotates actuator 116 in a radially inward direction to disengage suspensions 112 from ramps 130 and thereby load sliders 110 onto the disc surfaces. When sliders 110 are loaded onto the disc surfaces, the ramp unloading process introduces a roll motion in the sliders. Depending upon the magnitude of the roll motion, the pitch static angle (PSA) of the suspension, and the roll static angle (RSA) of the suspension, it is possible that the tilt of a typical slider with respect to the radial load-unload motion of actuator 116 can cause the edges or corners of the slider to contact the disc surface. This contact can range from light contact to severe impact and can cause damage to stored data or permanent physical damage to the media Sliders 110 have a bearing geometry that reduces the chances and severity of such contact.

Figure 2:
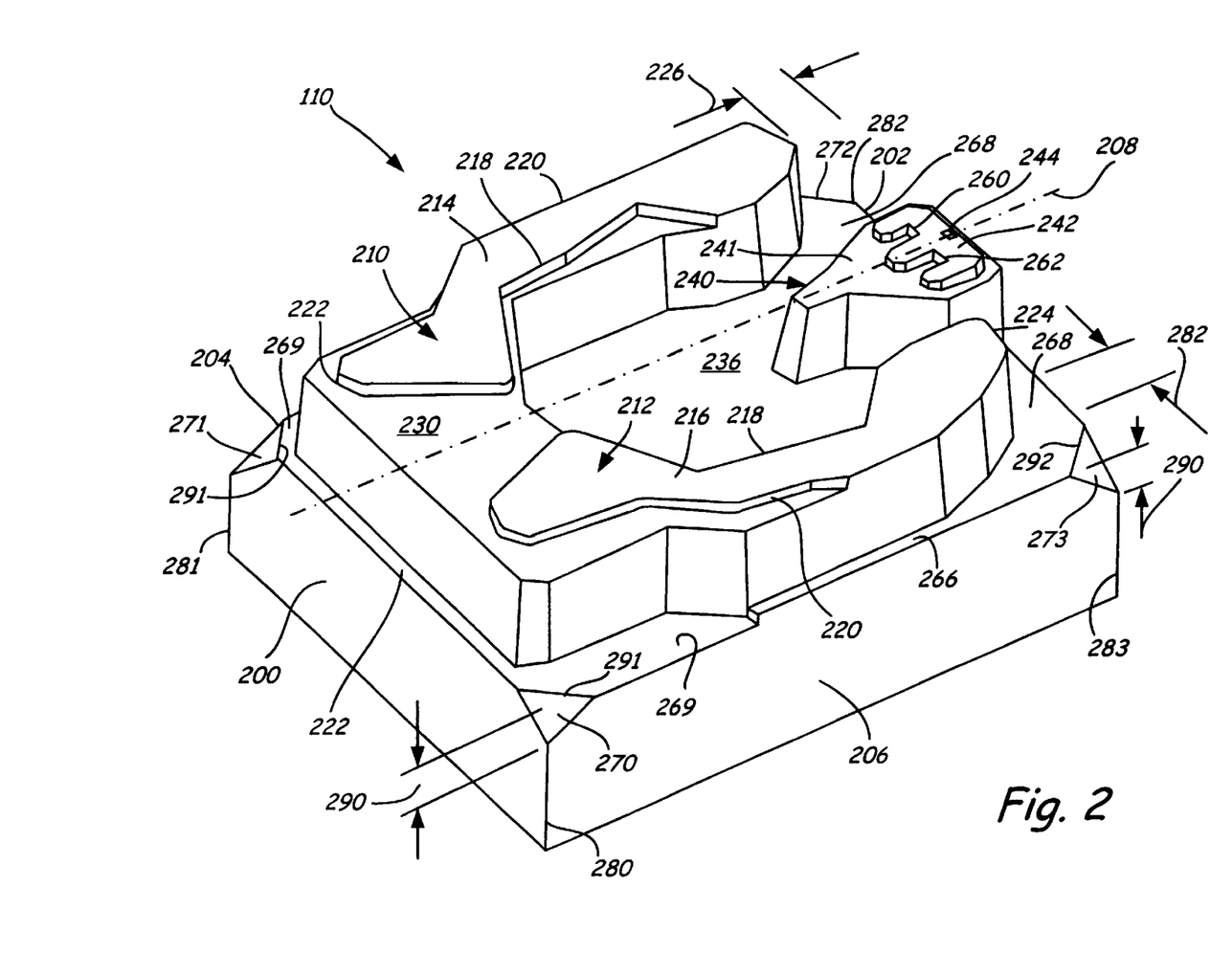
FIG. 2 is a bottom, perspective view of a slider shown in FIG. 1, as viewed from the surface of a disc, according to one embodiment of the present invention.

FIG. 2 is a bottom, perspective view of one of the sliders 110 of FIG. 1, as viewed from the surface of disc 107 according to one embodiment of the present invention. The vertical dimensions of slider 110 are greatly exaggerated in FIG. 2 for clarity. Slider 110 has a leading edge 200, a trailing edge 202, side edges 204 and 206, and a lateral center line 208. Elongated, raised side rails 210 and 212 are positioned along side edges 204 and 206, respectively, and form bearing surfaces 214 and 216, respectively. Rails 210 and 212 extend generally from leading slider edge 200 toward trailing slider edge 202 and terminate prior to trailing slider edge 202. However, rails 210 and 212 can extend all the way to trailing slider edge 202 in alternative embodiments. Each rail 210 and 212 has an inside rail edge 218, an outside rail edge 220, a leading bearing rail edge 222 and a trailing rail edge 224.

A cavity dam 230 extends between rails 210 and 212, along leading slider edge 200. Cavity dam 230 has a leading edge 232 and a trailing edge 234. Cavity dam 230 and side rails 210 and 212 define a subambient pressure cavity (or "central recess") 236, which trails cavity dam 230 relative to a direction of air flow from the leading slider edge 200 toward trailing slider edge 202. In one embodiment, central recess 236 is recessed from bearing surfaces 214 and 216 by 1 to 3 um, and cavity dam 230 is recessed from bearing surfaces 214 and 216 by a step depth of 0.1 to 0.5 um, for example. Other depths can also be used. In addition, cavity dam 230 can be formed with a tapered leading edge in alternative embodiments, if desired.

A raised center pad or rail 240 is positioned along trailing slider edge 202 and is centered along lateral center line 208. In alternative embodiments, center pad 240 can be skewed or offset with respect to line 208. Center pad 240 has a leading step surface 241 and a bearing surface 242. Leading step surface 241 is generally parallel to and recessed from bearing surface 242 by a step depth of 0.1 to 0.5 um, for example, for providing pressurization of bearing surface 242 from air flow venting from central recess 236. Center rail 240 supports a read/write transducer 244 along trailing slider edge 202. In alternative embodiments, transducer 244 can be positioned at other locations on slider 110. However, when placed at or near trailing slider edge 202, transducer 244 is located at the closest point on slider 110 to the surface of disc 107 (shown in FIG. 1) under most nominal operating conditions. With a positive pitch angle, trailing slider edge 202 is closer to the surface of disc 107 than leading slider edge 200.

Rails 210 and 212 terminate prior to trailing slider edge 202 to allow slider 110 to roll about lateral center line 208 without risking contact between trailing rail edges 224 and the disc surface at nominal roll angles. Therefore, the trailing edge of center pad 240 remains the closest location on slider 110 to the disc surface during flight at nominal roll angles, thereby improving read and write performance. In one embodiment, trailing rail edges 224 are spaced from trailing slider edge 202 by a distance 226.

Similarly, outside rail edges 220 are spaced from slider side edges 204 and 206 by a distance 228 to allow individual sliders to be diced from a bar of slider substrate material without affecting the widths of bearing surfaces 216 and 218. This spacing is achieved by recessing outer surfaces 266 and trailing surfaces 268 when central recess 236 is formed Outer surfaces 266 and trailing surfaces 268 are coplanar and contiguous with central recess 236. Surfaces 269 are recessed during the formation of central recess 236 and the step surfaces 230 and 241. Thus, surfaces 269 have depths equal to the depth of central recess 236 plus the depth of step surfaces 230 and 241.

Truncating side rails 210 and 212 can reduce the amount of positive pressure developed along the rails near trailing slider edge 202, which can reduce pitch and roll stiffness. In order to limit the reduction in roll stiffness (and to increase the stiffness further), slider 110 includes convergent channel features 260 and 262, which are recessed within bearing surface 242 of center rail 240. These channels can also be referred to as trenches. A portion of the fluid flow from leading step surface 241 is directed into channels 260 and 262 and is forced to exit the channels over the trailing ends of the channels. This creates localized positive pressure areas on trailing bearing surface 242, rearward of channels 260 and 262, which can increase the pitch stiffness of slider 110.

Slider 110 further includes deeply recessed corner surfaces 270–273, which are positioned at corners 280–283, respectively, of slider 110. Recessed corner surfaces 270–273 further reduce the chance of contact between slider 110 and the disc surface during ramp load and unload operations and in response to operating shock events. Recessed corner surfaces 270–273 are recessed from bearing surfaces 214 and 216 by a depth that is greater than the depth of central recess 236.

In the embodiment shown in FIG. 2, recessed corner surfaces 270–273 are tapered surfaces that are angled with respect to bearing surfaces 214 and 216 such that recessed corner surfaces 270–273 have maximum depths 290 at corners 280–283. Recessed corner surfaces 270 and 271 intersect recessed surfaces 269 at intersections 291. Recessed corner surfaces 272 and 273 intersect trailing recessed surfaces 268 and outside recessed surfaces 266 at intersections 292. Recessed corner surfaces 270–273 can be formed by various abrasive, grinding, polishing, burnishing, etching, laser ablation, cutting or other blending processes.

During ramp load and unload operations and during operational shock events, recessed corner surfaces 270–273 can delay contact between slider 110 and the surface of the disc at corners 280–283 by allowing greater roll angles about lateral center line 208. The extra time allows slider 110 to reposition itself in order to develop the air bearing pressure needed to lift the slider away from the disc surface before contact occurs. Even if contact occurs, the overall impact with the disc surface is substantially reduced. In one embodiment, the sizes and shapes of recessed corner surfaces 270–273 are chosen to maximze the delay of contact at the pitch and roll attitudes at which contact is possible.

Figure 31:
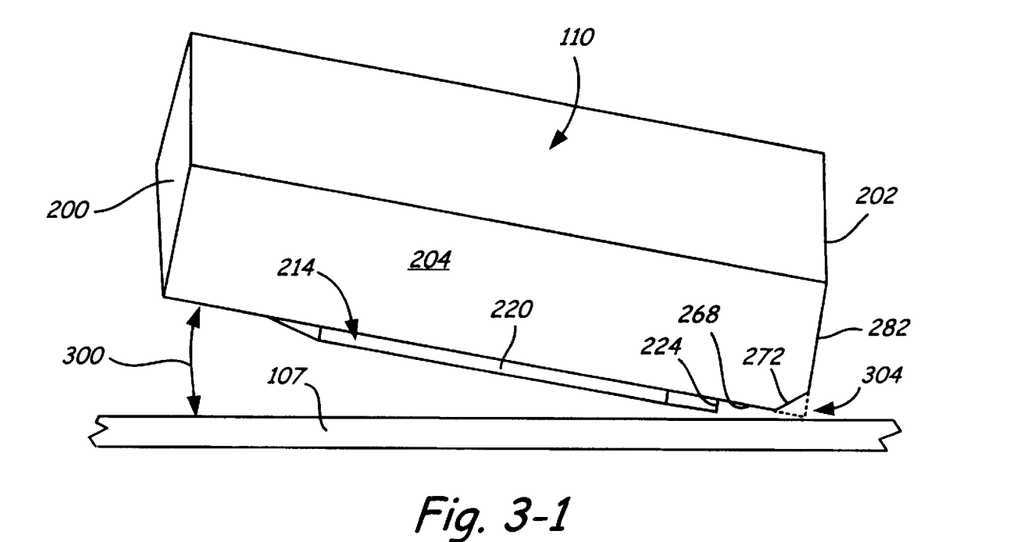
Figure 32:
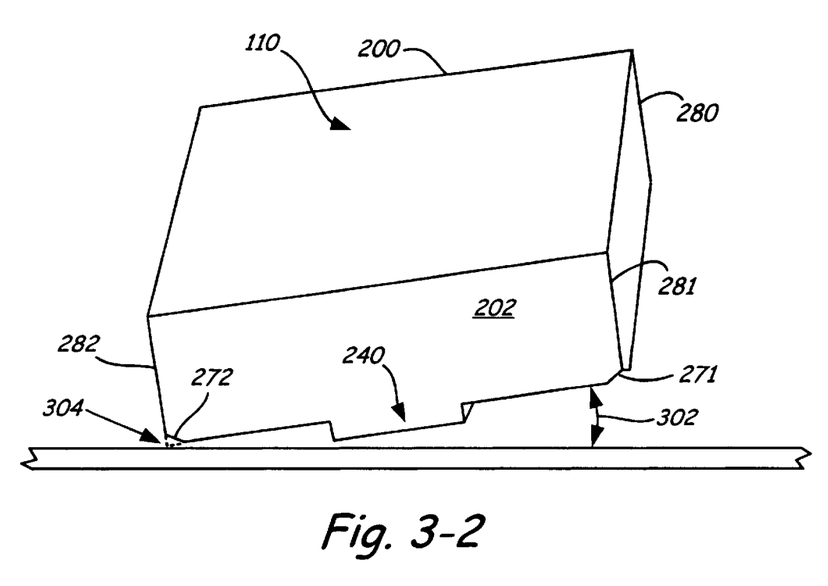

FIGS. 3-1 and 3-2 are side and end views, respectively, of slider 110 positioned over the surface of disc 107 with a pitch angle 300 and a roll angle 302 at which slider 110 is close to contacting the surface of the disc. Dashed lines 304 show that without recessed corner surface 272, corner 282 of slider 110 would be in contact with the surface of disc 107, given the pitch and roll angles 300 and 302 of slider 110. The separation between trailing rail edges 224 and trailing slider edge 202 and the separation between the outside edges 220 of rails 214 and 216 and the side edges 204 and 206 of slider 110 are selected such that surface 272 (or surface 273) becomes the closest point on slider 110 to the surface of disc 107 during contact.

In one embodiment, recessed corner surfaces 272 and 273 have a shape, area and depth that is chosen to provide extra air pressurization for slider 110 as surface 272 (or surface 273) comes close to disc 107. For example, recessed corner surfaces 270–273 can have areas between about 50×50 microns to about 250×250 microns and can have a maximum depth measured from the respective recessed surfaces 268 and 269 of 1–5 microns. The particular depths and areas may depend on the slider's pitch and roll static angles, the spacing of the side rails from the slider corners, the available area for forming the recessed surfaces and other factors.

Figure 4:
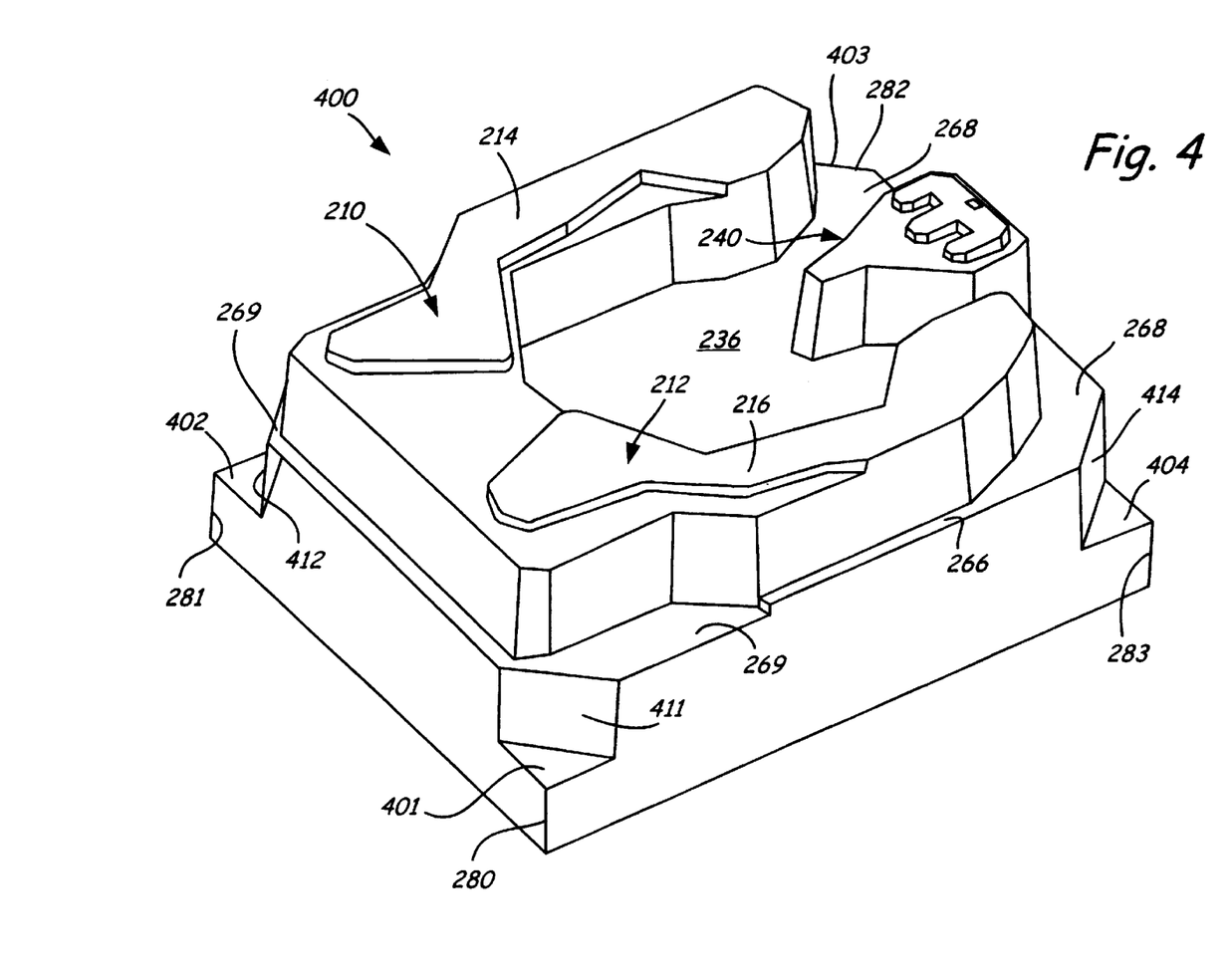
FIG. 4 is a bottom, perspective view of a slider, as viewed from the surface of a disc, according to an alternative embodiment of the present invention.

FIG. 4 is a perspective view of a slider 400 according to an alternative embodiment of the present invention. The same reference numerals are used in FIG. 4 as were used in FIGS. 2–3 for the same or similar elements. Once again, the vertical dimensions in FIG. 4 are exaggerated for clarity. Slider 400 includes stepped recessed corner surfaces 401–404 in corners 280–283, respectively. Stepped corner surfaces 401–404 are generally parallel with bearing surfaces 214 and 216. Stepped corner surfaces 401 and 402 join recessed surfaces 269 through side walls 411 and 412, respectively. Similarly, stepped corner surfaces 403 and 404 join recessed outside surfaces 266 and recessed trailing surfaces 268 through side walls 413 (not shown) and 414, respectively.

The bearing performance of a slider that is designed for ramp load-unload applications can be measured against a PSA/RSA "envelope". The PSA and RSA values are important parameters for ramp load-unload applications. The PSA is the angle between the slider and the suspension arm in a direction parallel to the suspension's axis of symmetry when no air bearing is formed (i.e., static). RSA is the angle between the slider and the suspension in a direction perpendicular to the suspension's axis of symmetry. Since PSA and RSA have an influence on pitch and roll fly attitude, non-optimal PSA and/or RSA values result in a slider tilting with respect to the radial motion of the load-unload operation, which can increase the chances of contact between the head and the disc surface.

The PSA/RSA envelopes for slider 110 (shown in FIG. 2) was compared with a similar slider (not shown) that had the same bearing geometry but no recessed corner surfaces. The results are graphically represented in FIGS. 5–8, which plot contact conditions against PSA values ranging from –0.5 to +2 degrees and RSA values ranging from –0.5 to +1.5 degrees during ramp load and unload operations. In each figure, the x-axis represent roll static angle in degrees and the y-axis represents pitch static angle in degrees. Individual data points are represented by either a circle, a square or a cross. The circles indicate PSA/RSA combinations resulting in no contact between the slider and disc, where a deflection limiter on the suspension has not engaged during the ramp load or unload operation. Deflection limiters have been used in ramp load-unload applications for limiting deflection of and damage to the flexure portion of the suspension as a negative pressure slider is lifted off the disc surface. The squares indicate PSA/RSA combinations resulting in no contact between the slider and disc, where the deflection limiter of the suspension has engaged during the ramp load or unload operation. Finally, the crosses indicate PSA/RSA combinations resulting in contact between the slider and disc. The non-contact envelope therefore includes all circular or square data points.

Figure 5:
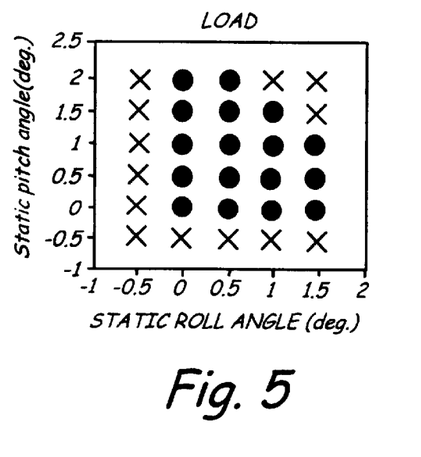
FIGS. 5 to 8 are graphs illustrating PSA/RSA non-contact envelopes during load and unload operations for the slider shown in FIG. 2 and a similar slider (not shown) that had the same bearing geometry but no recessed corner surfaces.
Figure 6:
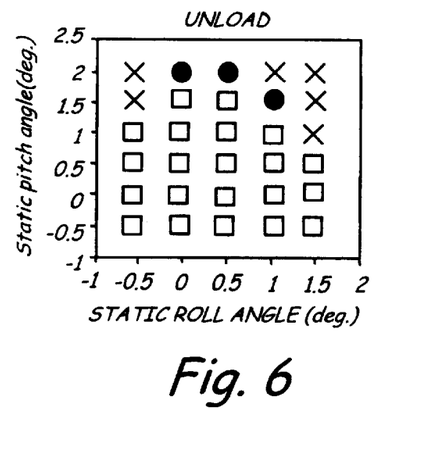

FIGS. 5 and 6 show the PSA/RSA non-contact envelope during load and unload operations, respectively, for the slider having no recessed corners. In FIG. 5, the RSA values at which there is no contact during a load operation are contained within the envelope range from 0 degrees to 1.5 degrees. At an RSA value of 1.5 degrees, there are only three PSA values at which there is no contact. There are a total of 17 non-contact data points in the entire range of PSA/RSA values in FIG. 5. In FIG. 6, the RSA values that are contained within the non-contact envelope during an unload operation range from –0.5 degrees to 1.5 degrees. At an RSA value of –0.5 degrees, there are four PSA values at which there is no contact. At an RSA value of 1.5 degrees, there are three values at which there is no contact. Also, there are a total of 24 non-contact data points in the envelope.

Figure 7:
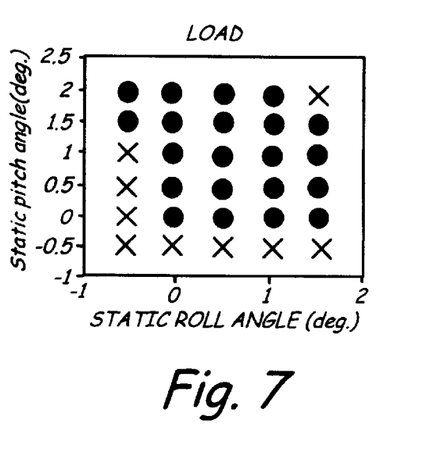
Figure 8:
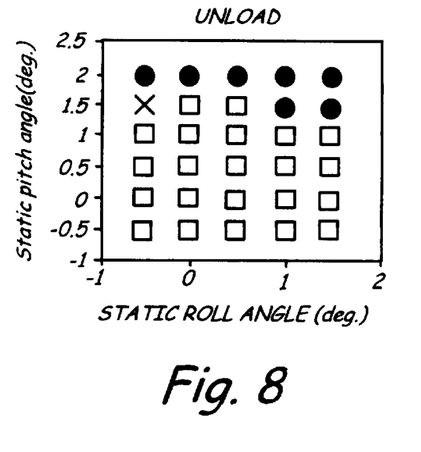

FIGS. 7 and 8 show the PSA/RSA non-contact envelope during load and unload operations, respectively, for slider 110. In FIG. 7, the RSA values that are contained within the non-contact envelope during a load operation now range from –0.5 degrees to 1.5 degrees. Also, at an RSA value of 1.5 degrees, there are now four PSA values at which there is no contact. In addition, there are now a total of 21 non-contact data points in the entire range of PSA/RSA values in FIG. 8, which exceeds the 17 non-contact data points shown in FIG. 6. In FIG. 8, the RSA values that are contained within the non-contact envelope during an unload operation also range from –0.5 degrees to 1.5 degrees. However, there are now a total of 29 non-contact data points in the entire range of PSA/RSA values in FIG. 9, which exceeds the 24 non-contact data points shown in FIG. 6. The PSA/RSA non-contact envelope for slider 110 is therefore larger than that for a similar slider having no recessed corners.

Figure 9:
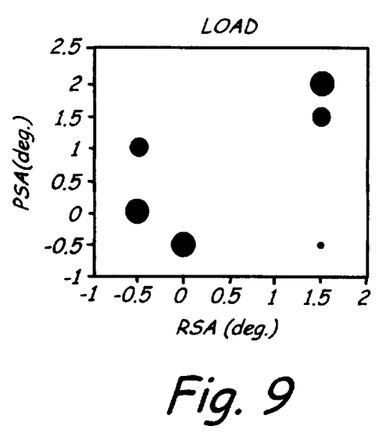
FIGS. 9 to 12 are graphs illustrating "contact energy" over a range of PSA/RSA values during load and unload operations for the slider shown in FIG. 2 and a similar slider (not shown) that had the same bearing geometry but no recessed corner surfaces.
Figure 10:
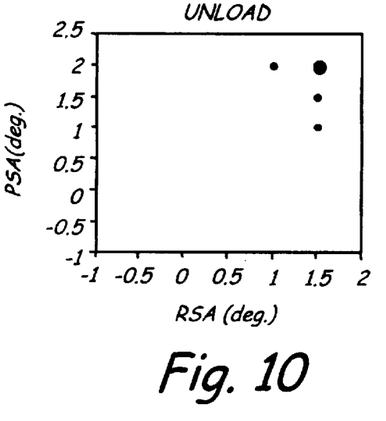
Figure 11:
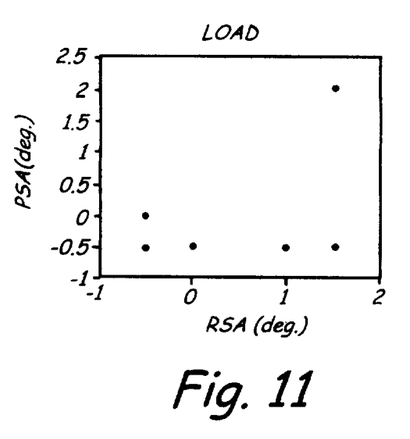
Figure 12:
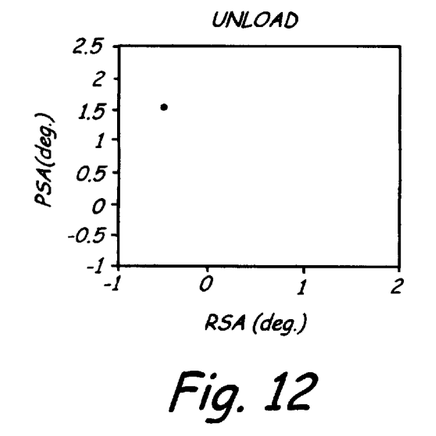

FIGS. 9 and 10 are plots of the "contact energy" during load and unload operations, respectively, of a slider having no recessed corners. FIGS. 11 and 12 are plots of the "contact energy" during load and unload operations, respectively, of slider 110 (shown in FIG. 2) with recessed corners. In each figure, the x-axis represents roll static angle in degrees and the y-axis represents pitch static angle in degrees. The term "contact energy" is defined as contact forced multiplied by time. Contact energy is a measure of the overall impact of the contact. Each figure includes one or more circles. The size of each circle indicates the severity of impact, with a larger circle representing a greater contact energy. FIGS. 9 to 12 clearly show that the overall impact during both load and unload operations of a slider having recessed corners is significantly reduced as compared to a similar slider having no recessed corners.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive while maintaining substantially the same functionality without departing from the scope and spirit of the present invention. In addition, although the slider example described is a negative pressure slider, it will be appreciated by those skilled in the art that the teachings of the present invention can be applied to other types of sliders, such as positive pressure slider having no cavity dam and sliders having different numbers of rails and rail shapes without departing from the scope and spirit of the present invention. Also, the present invention can be used with any type of ramp load-unload or contact start-stop suspension, such as rotary and linear suspensions, and the transducing head can be of any type such as magnetic, magneto-resistive, optical or magneto-optical, for example.

What is claimed is:

1. A disc head slider for supporting a transducer relative to a data storage disc, the slider comprising:

a slider body having a disc-facing surface with a leading slider edge, a trailing slider edge, and first and second slider corners at opposing ends of the trailing slider edge;

first and second rails disposed on the disc facing surface about a central recess and forming first and second bearing surfaces, respectively, wherein the central recess has a depth measured from the first and second bearing surfaces;

first and second recessed surfaces positioned between a trailing edge of the first and second rails and the first and second slider corners, respectively, and being generally coplanar with the central recess; and third and fourth recessed corner surfaces, which are positioned at the first and second slider corners, respectively, are recessed from the first and second recessed surfaces.

2. The disc head slider of claim 1 wherein the third and fourth recessed corner surfaces are step surfaces that are recessed from and generally parallel to the first and second bearing surfaces and the central recess.

3. The disc head slider of claim 1 wherein the third and fourth recessed corner surfaces are tapered surfaces that are non-parallel to the first and second recessed surfaces and the central recess such that the third and fourth recessed corner surfaces have maximum depths at the first and second slider corners, respectively.

4. The disc head slider of claim 1 and further comprising:
first and second slider side edges extending from the leading slider edge to the trailing slider edge; and
wherein the first and second rails are separated from the first and second slider edges, respectively, by the first and second recessed surfaces, respectively, which are generally coplanar with the central recess.

5. The disc head slider of claim 1 wherein:
the first and second rails extend between the leading and trailing slider edges and terminate prior to the trailing slider edge;
the first and second recessed surfaces extend between the trailing slider edge and the first and second rails, respectively, and are contiguous and generally coplanar with the central recess; and
the third and fourth recessed corner surfaces are recessed within the first and second recessed surfaces, respectively.

6. The disc head slider of claim 5 wherein the third and fourth recessed corner surfaces are step surfaces that are generally parallel to the first and second recessed surfaces and are joined with the first and second trailing recessed surfaces by first and second wall surfaces, respectively.

7. The disc head slider of claim 5 wherein the third and fourth recessed corner surfaces are tapered surfaces that are non-parallel to the first and second recessed surfaces and extend from an intersection with the first and second recessed surfaces, respectively, to the first and second slider corners, respectively, and have maximum depths at the first and second slider corners.

8. The disc head slider of claim 1 wherein the third and fourth recessed corner surfaces have maximum depths between 1 micron and 5 microns, as measured from the first and second recessed surfaces.

9. The disc head slider of claim 1 wherein the third and fourth recessed corner surfaces each have a surface area that is between 1,500 square microns and 62,500 square microns.

10. The disc head slider of claim 1 and further comprising:
third and fourth slider corners at opposing ends of the leading slider edge; and
fifth and sixth recessed corner surfaces, which are positioned at the third and fourth slider corners, respectively, and are recessed from the first and second bearing surfaces by a depth that is greater than the depth of the central recess.

11. A disc drive assembly comprising:
a housing;
a disc rotatable about a central axis within the housing;
an actuator mounted within the housing, the actuator having a parked position along an edge of the disc;
a ramp positioned along the edge of the disc to engage a portion of the actuator when the actuator is in the parked position; and
a slider supported over the disc by the actuator and comprising:
a disc-facing surface with a leading slider edge, a trailing slider edge, and first and second slider corners at opposing ends of the trailing slider edge;
first and second rails disposed on the disc facing surface about a central recess and forming first and second bearing surfaces, respectively, wherein the central recess has a depth measured from the first and second bearing surfaces; and
first and second recessed surfaces positioned between a trailing edge of the first and second rails and the first and second slider corners, respectively, and being generally coplanar with the central recess; and
third and fourth recessed corner surfaces, which are positioned at the first and second slider corners, respectively, and are recessed from the first and second bearing surfaces by a depth that is greater than the depth of the central recess.

12. The disc drive assembly of claim 11 wherein the third and fourth recessed corner surfaces are step surfaces that are recessed from and generally parallel to the first and second recessed surfaces and the central recess.

13. The disc drive assembly of claim 11 wherein the third and fourth recessed corner surfaces are tapered surfaces that are non-parallel to the first and second recessed surfaces and the recessed cavity such that the third and fourth recessed corner surfaces have maximum depths at the first and second corners, respectively.

14. The disc drive assembly of claim 11 and further comprising:
first and second slider side edges extending from the leading slider edge to the trailing slider edge;
wherein the first and second rails are separated from the first and second slider edges, respectively, by the first and second recessed surfaces, respectively; and
the third and fourth recessed corner surfaces are formed within the first and second recessed surfaces, respectively.

15. The disc drive assembly of claim 11 wherein:
the first and second rails extend between the leading and trailing slider edges and terminate prior to the trailing slider edge;
the first and second recessed surfaces extend between the trailing slider edge and the first and second rails, respectively, and are contiguous with the central recess; and
the third and fourth recessed corner surfaces are recessed within the first and second recessed surfaces, respectively.

16. The disc drive assembly of claim 11 wherein:
the slider has a load and unload position adjacent the ramp at which the slider is loaded onto and unload from the disc;
the slider has first and second slider side edges, which extend from the leading slider edge to the trailing slider edge; and
the first and second rails are spaced from the first and second slider side edges and the trailing slider edge such that any contact between the slider and the disc along the trailing slider edge at the load and unload position occurs at one of the third and fourth recessed corner surfaces.

17. The disc drive assembly of claim 11 wherein the third and fourth recessed corner surfaces are recessed from the first and second recessed surfaces by 1 micron to 5 microns.

18. The disc drive assembly of claim 11 wherein the third and fourth recessed corner surfaces each have a surface area that is between 1,500 square microns and 62,500 square microns.

19. The disc drive assembly of claim 11 and further comprising:

third and fourth slider corners at opposing ends of the leading slider edge; and fifth and sixth recessed corner surfaces, which are positioned at the third and fourth slider corners, respectively, and are recessed from the first and second bearing surfaces by a depth that is greater than the depth of the central recess.

20. A disc drive assembly comprising:

a disc rotatable about a central axis;

a ramp load-unload suspension; and slider bearing means supported over the disc by the suspension and having deeply recessed trailing corners for forming recessed bearing surfaces that limit contact energy between the slider bearing means and the disc during ramp load and unload operations of the suspension.

* * * * *